(12) United States Patent
Di Simone

(10) Patent No.: US 7,857,614 B2
(45) Date of Patent: Dec. 28, 2010

(54) CONTINUOUS MOLDING MACHINE

(75) Inventor: John Di Simone, Woodbridge (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 702 days.

(21) Appl. No.: 11/554,277

(22) Filed: Oct. 30, 2006

(65) Prior Publication Data
US 2008/0102153 A1 May 1, 2008

(51) Int. Cl.
B29C 69/00 (2006.01)
(52) U.S. Cl. .................. 425/528; 425/556; 425/564; 425/572; 425/577; 425/451.4
(58) Field of Classification Search ............. 425/451.4, 425/528, 533, 556, 564, 572, 577; 264/334
See application file for complete search history.

(56) References Cited
U.S. PATENT DOCUMENTS 3,730,665 A 5/1973 Fortin et al.
3,833,329 A 9/1974 Ulmachneider
3,918,864 A 11/1975 Braun
4,080,148 A 3/1978 Wise
4,186,161 A 1/1980 Ulmschneider et al.
4,729,732 A 3/1988 Schad
4,773,843 A 9/1988 Albrecht et al.
5,509,796 A 4/1996 Di Settembrini
5,643,620 A 7/1997 Brun
6,814,905 B1 * 11/2004 Dalgewicz et al. ....... 264/37.32
7,137,804 B2 * 11/2006 Mue et al. ................ 425/451.4
2003/0227108 A1 12/2003 Okerson
2004/0151797 A1 8/2004 Mue et al.

FOREIGN PATENT DOCUMENTS

GB 833565 A 4/1960

* cited by examiner

Primary Examiner—Richard Crispino
Assistant Examiner—Thu Khanh T Nguyen
(74) Attorney, Agent, or Firm—Husky Intellectual Property Services

(57) ABSTRACT

Disclosed, amongst other things, is: a continuous molding machine, a cam of the continuous molding machine, a post-molding device of the continuous molding machine, a molded article handling device, amongst other things.

12 Claims, 11 Drawing Sheets

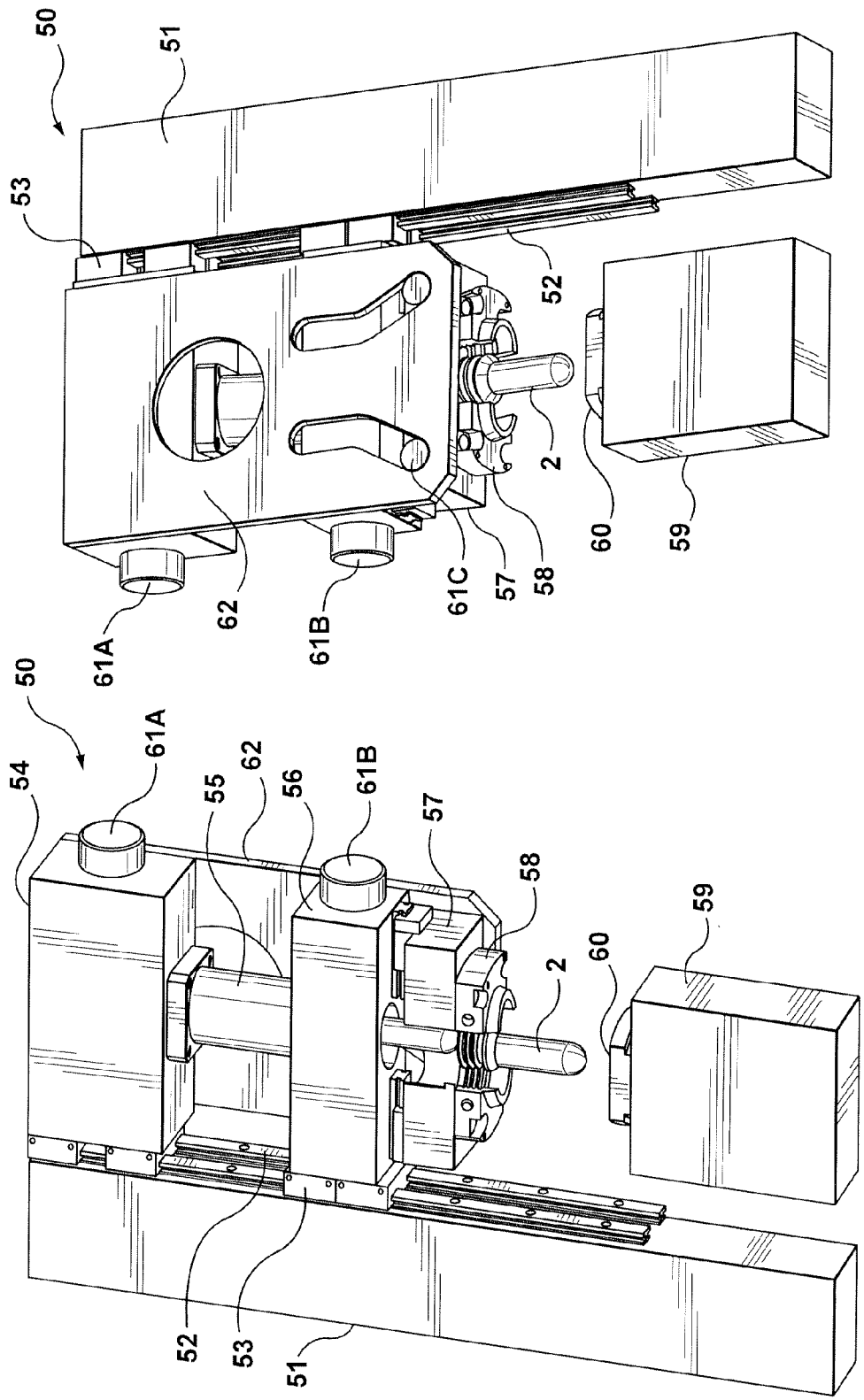

CONTINUOUS MOLDING MACHINE

TECHNICAL FIELD

The present invention generally relates to, but is not limited to, molding machines, and more specifically the present invention relates to, but is not limited to, a continuous molding machine, a cam of the continuous molding machine, a post-molding device of the continuous molding machine, a molded article handling device, amongst other things.

BACKGROUND

U.S. Pat. No. 3,833,329 (Inventor: ULMACHNEIDER, Lawrence, A., Published: 3 Sep. 1974) describes a continuous injection molding system that includes a rotatable rotor member having a plurality of mold assemblies disposed about the periphery thereof. Each mold assembly has an injection chamber and an openable mold cavity. A stationary molten plastic supply means is disposed adjacent the periphery of the rotor member and is arranged to supply for example molten thermoplastic material to the injection chamber of a mold assembly as it is continuously moved past the supply means. Each mold assembly has an injection means arranged for movement into the injection chamber after the mold assembly has moved past the supply means to inject the molten thermoplastic material in the injection chamber into the mold cavity. Means is arranged to open each of the molds after the molten material injected therein has solidified, and to close the mold after removal of the solidified material therefrom and before the mold reaches the supply means. The means to open the molds and the injection means include a mold lifting hydraulic cylinder and an injection ram, respectively, and corresponding operating valves which engages and are actuated by a stationary cam member as the mold assembly is rotated about the stationary base assembly.

U.S. Pat. No. 3,918,864 (Inventor: BRAUN, Dieter, B., Published: 11 Nov. 1975) describes a continuous injection molding system that includes a mold that is closed about an elongated element at a receiving location, and synthetic plastic material is introduced into the mold to injection-mold a synthetic plastic member about the element within the mold. The mold with the elongated element is advanced in a circular path until the material of the synthetic plastic member has hardened, and thereupon the mold is opened at a discharging location. The molds are closed by a pressure ram via a pressure spring as rollers roll along rails having a wavy configuration.

U.S. Pat. No. 4,080,148 (Inventor: WISE, Joseph, Published: 21 Mar. 1978) describes a continuous injection molding system that includes a rotatable wheel having molding cavities formed in the perimeter thereof. Movable coring pins are mounted on the wheel perimeter and have cam track follower means which ride in stationary cam tracks positioned adjacent the wheel and which move the coring pins in and out of said cavities as said wheel rotates.

U.S. Pat. No. 5,643,620 (Inventor: BRUN, Charles, Jr., Published: 1 Jul. 1997) describes an injection molding system for serially molding articles that includes a circular array of molds, arranged in mold clamp assemblies, and a runner system coupling an extruder output with the circular array of molds. Each clamp assembly includes separate mold actuation mechanisms. The runner system includes an accumulator chamber which is defined in part by a vertically reciprocal piston that is actuated by a hydraulic cylinder. A valve is connected between the runner system and an input leading to an accumulator chamber of each mold of the circular array for sequentially directing the plasticized resin into each of the molds to form a molded article therein. A molded article extractor sequentially removes the molded article from each of the molds, and a molded article handling apparatus coupled to the molded article extractor arranges the molded articles in a series for removal through the central area.

SUMMARY

According to a first aspect of the present invention, there is provided a continuous molding machine. The continuous molding machine preferably includes a frame, a mold structure non-movably connected to the frame, and a cam movably linked to both the frame and to the mold structure for driving functions of the mold structure. The functions of the mold structure driven by the cam include at least one of a mold stroke function, a molded article ejection function, an melt handling function, a valve gate function, and a mold clamping function.

According to a second aspect of the present invention, there is provided a continuous molding machine cam. The cam preferably includes a cam body configured to be movably linked to both a frame of a continuous molding machine and to a mold structure that is non-movably connected to the frame for driving functions of the mold structure. The functions of the mold structure driven by the cam include at least one of a mold stroke function, a molded article ejection function, an melt handling function, a valve gate function, and a mold clamping function.

According to a third aspect of the present invention, there is provided a continuous molding machine post-molding device. The post-molding device preferably includes a post-mold cooling table movably linked to a frame of a continuous molding machine, a quantity of molded article holders linked to the post-mold cooling table, the molded article holders configured to receive and hold just-molded molded articles from a plurality of molding devices that are non-movably connected to the frame and the quantity of molded article holders at least equals a total number of molding cavities defined in the mold structures in the continuous molding machine.

According to a fourth aspect of the present invention, there is provided a continuous molding machine molded article handling device. The molded article handling device preferably includes a base, a base arm rotatably mounted to the base, a slide arm slidably linked to the base arm, the slide arm configured to retain a molded article holder, a cam non-rotatably linked to the base, the slide arm movably linked to the cam for driving a sliding of the slide arm with respect to the base arm, whereby the molded article holder is translatable along a profiled path for retrieving just-molded articles from a molding device of a continuous molding machine.

A technical effect, amongst others, of the aspects of the present invention is the provision of a continuous molding machine having a simplified configuration whereby complex systems of components, such as the molding devices, are mounted to a stationary frame.

Preferable embodiments of the present invention are subject of the dependent claims.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which:

FIG. 4A is a first perspective view of a mold according to a first exemplary embodiment (which is the preferred embodiment) for use in the continuous molding machine of FIG. 1;

FIG. 4B is a second perspective view of the mold according to the first exemplary embodiment;

The drawings are not necessarily to scale and may be illustrated having phantom lines, diagrammatic representations and fragmentary views. In certain instances, details that are not necessary for an understanding of the exemplary embodiments or that render other details difficult to perceive may have been omitted.

DETAILED DESCRIPTION OF THE EXEMPLARY EMBODIMENTS

Figure 1:
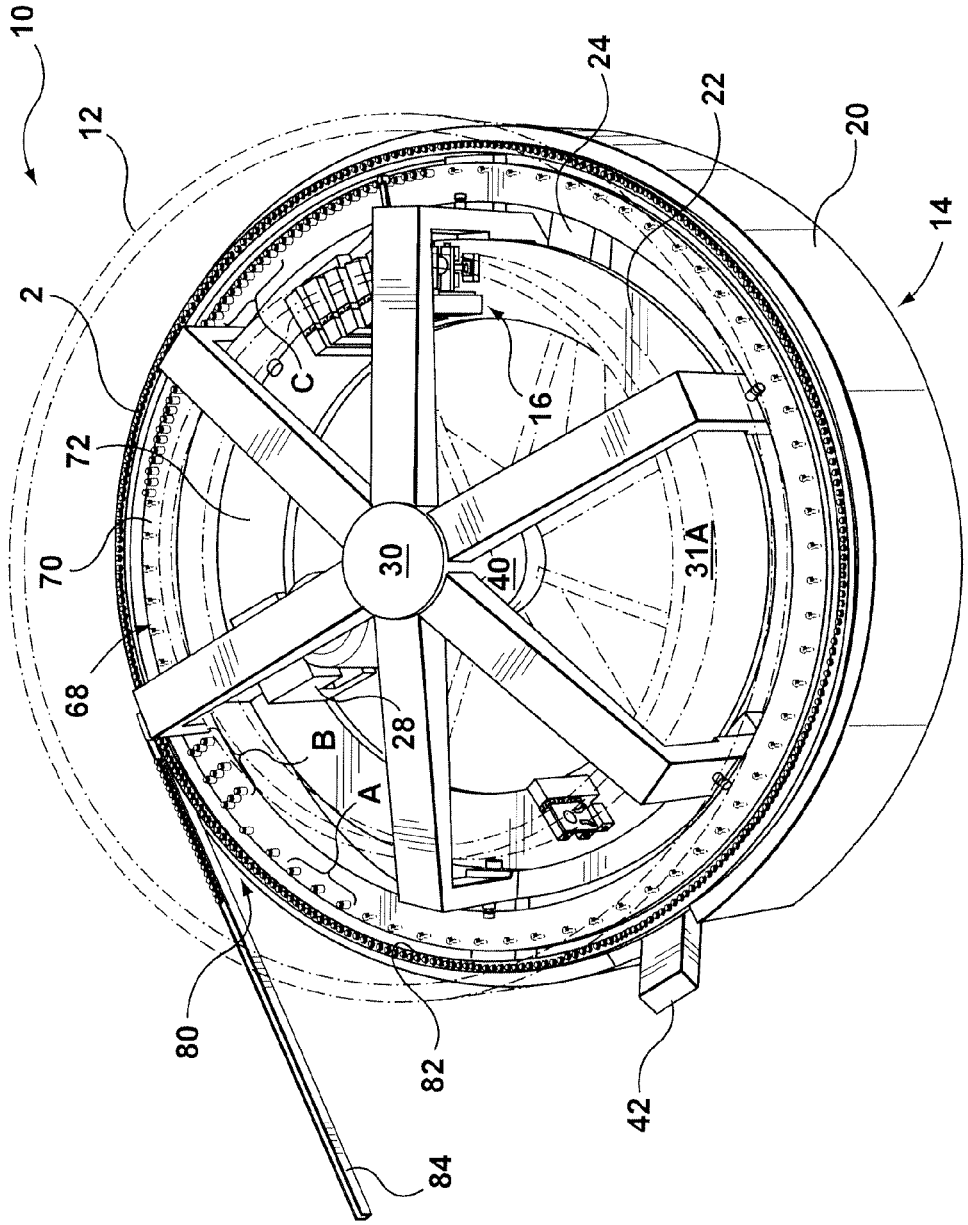
FIG. 1 is a perspective view of a continuous molding machine according to a first exemplary embodiment (which is the preferred embodiment)

With reference to FIG. 1, a continuous molding machine 10 is shown. The continuous molding machine 10 is configured for a continuous production of molded articles 2. In accordance with an exemplary embodiment, the molded articles 2 are preforms of the type that are subsequently blow molded into bottles (not shown). The preforms are preferably injection molded from a molding material such as polyethylene terephthalate (PET). Of course, other types of molded articles may be made from a variety of resins and in accordance with other molding processes (e.g. compression molding, extrusion molding, etc.).

In accordance with the exemplary embodiment, the continuous molding machine 10 includes a stationary frame 14 upon which are mounted a plurality of molding devices 16 in a circular array. Rotatably mounted to the frame 14 is a rotor 30 that upon rotation will drive the molding devices 16 through a cycle of operations as will be described in detail hereinafter. The continuous molding machine 10 also includes a hot runner 40 for distribution of molding material to the molding devices 16. The continuous molding machine 10 also preferably includes a post-molding device 68 for post-mold cooling of the molded articles once they have been removed from the molding devices 16. Furthermore, the continuous molding machine 10 also preferably includes a molded article transport device 80 for transport of the molded articles 2 from the post-molding device 68, or directly from the molding devices 16, to an auxiliary process such as a blow molding machine (not shown), or to storage and/or packaging of the molded articles 2.

Figure 2:
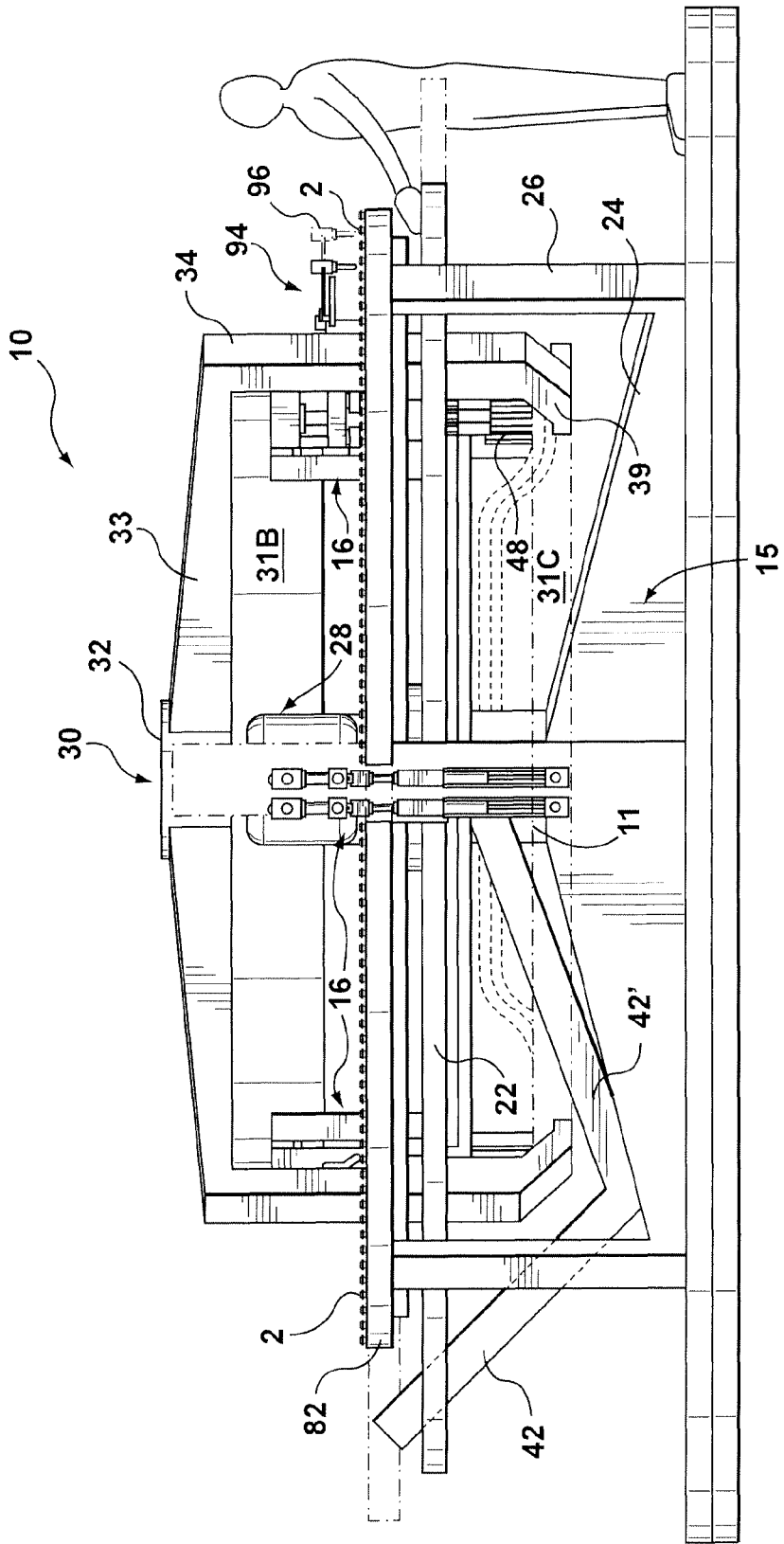
FIG. 2 is a side view of the continuous molding machine of FIG. 1 with a frame cover and guard removed.

The structure of the frame 14 will now be described in more detail. The frame 14 includes a frame cover 20 that provides an annularly-shaped wall covering a periphery of a sub-frame 15. For safety, a guard 12 is arranged above a top surface of the frame cover 20. The guard 12 preferably includes a movable gate (not shown) through which the mechanisms within the continuous molding machine may be accessed for sake of maintenance. The sub-frame 15 is shown in FIG. 2 as including a series of base uprights 26 that extend upwardly from outer ends of base spokes 24, the base spokes 24 extending radially from a central hub 11. A top surface of the base upright 26 provides a mounting surface for a collector track 82 of the molded article transport device 80. The base upright 26 also includes an inwardly extending member (not shown) for supporting an annular table 22. The annular table 22 is preferably an annular shaped body that is configured to provide a stationary base upon which the plurality of molding devices 16 may be mounted. The annularly-shaped table 22 is preferably concentrically mounted with the central hub 11 of the sub-frame 15. The molding devices 16 are preferably are preferably arranged in an equi-angularly spaced circular array around the table 22 as shown in FIG. 1 (Not all of the molding devices 16 of the array are shown in FIG. 1).

Figure 5:
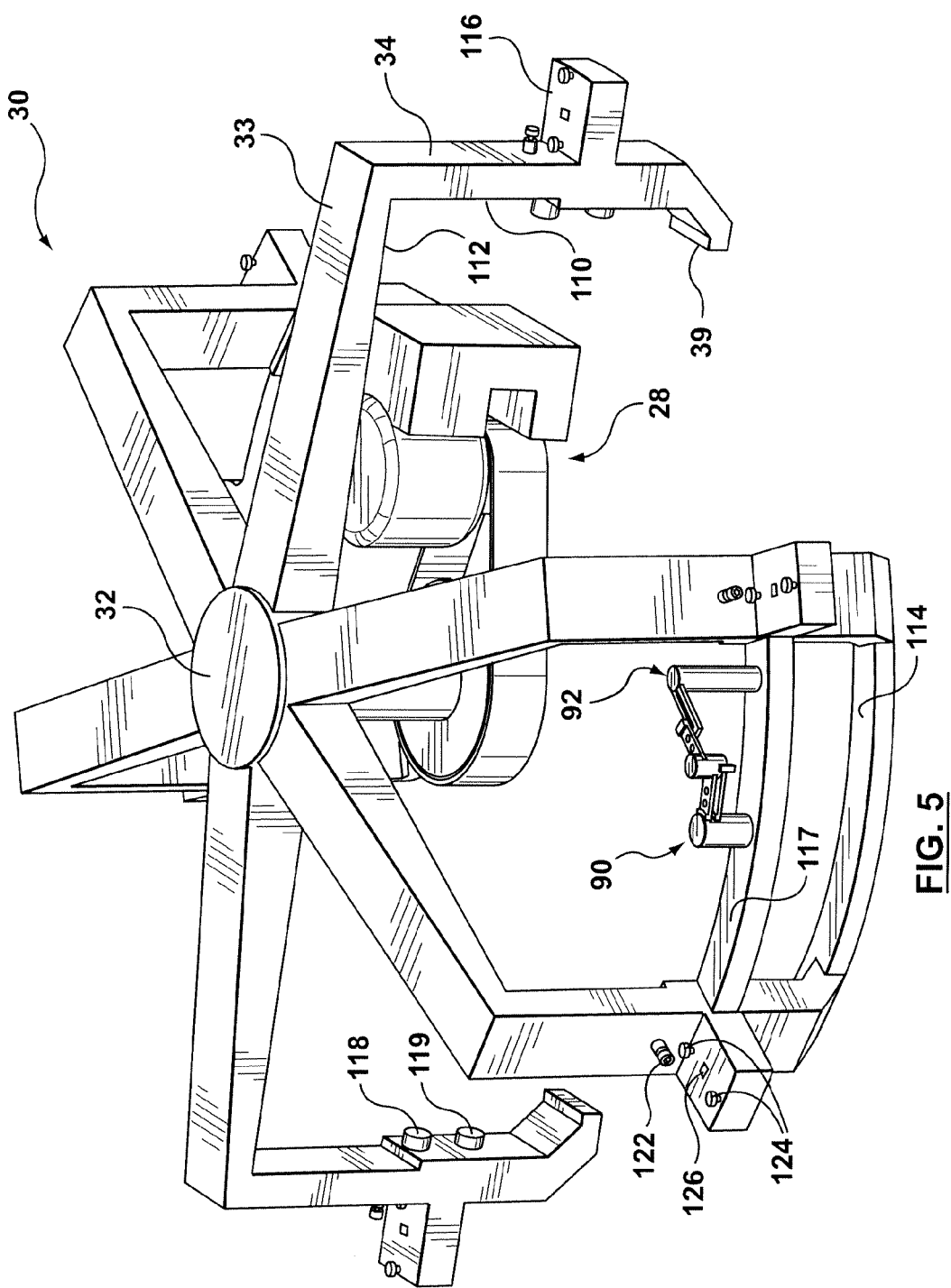
FIG. 5 is a perspective view of a rotor of the continuous molding machine of FIG. 1.
Figure 6:
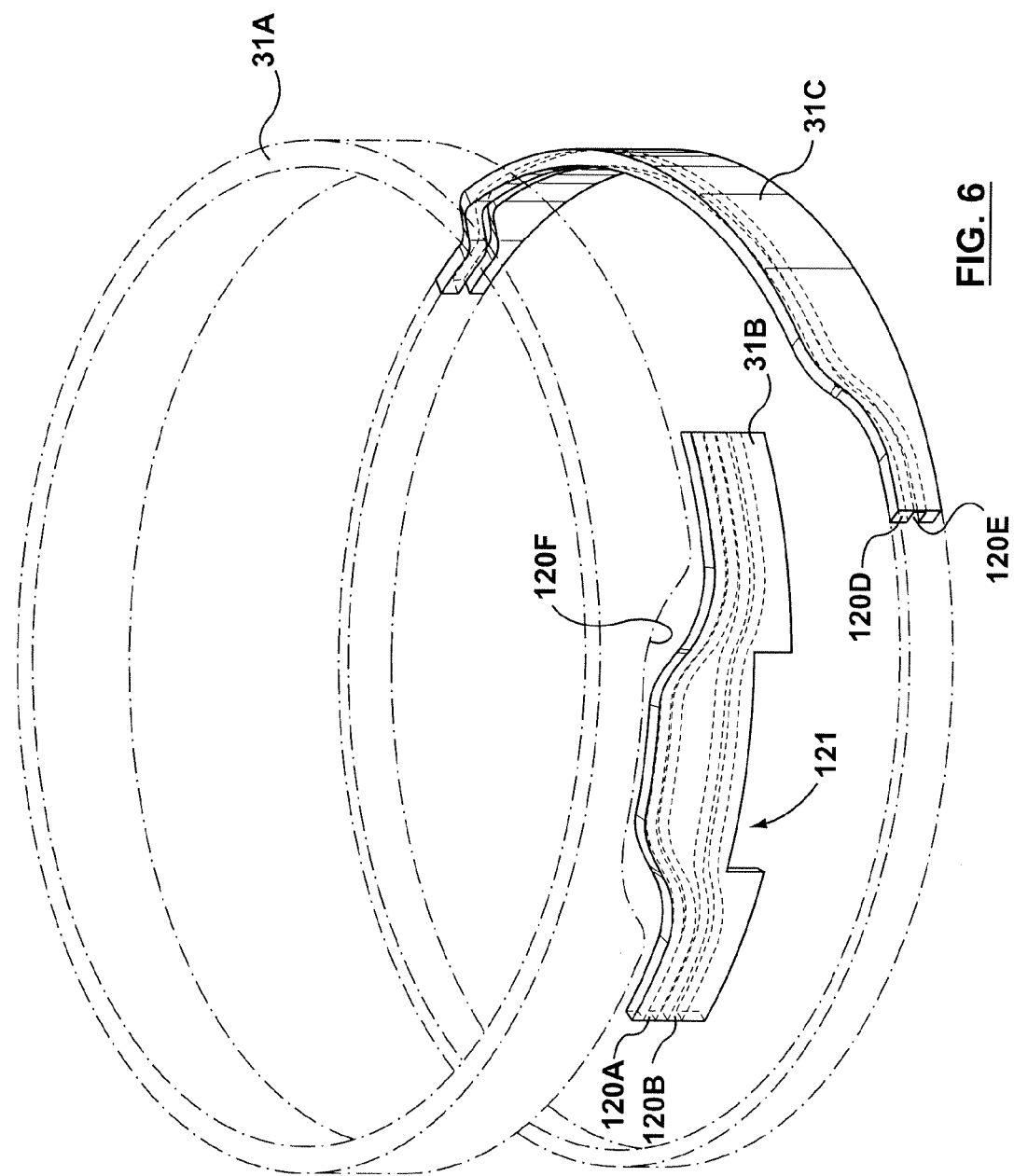
FIG. 6 is a perspective view of a set of cams of the continuous molding machine of FIG. 1.

With reference to FIGS. 1, 5 & 6 the rotor 30 is shown in greater detail. The rotor 30 includes a rotor hub 32 with a plurality of rotor spokes 33 radially extending therefrom. Downwardly extending from the ends of the rotor spokes 33 are rotor uprights 34. On the inside surface of the rotor uprights 34 are shown an upper roller 118 and a lower roller 119. The upper and lower rollers 118 and 119 are configured to rotatably engage a top and a bottom surface of the table 22 for guidably supporting an outer periphery of the rotor 30 as it rotates around the table 22. On an outside surface of the rotor uprights 34 is a cooling table mount 116. The cooling table mount 116 configured to rotatably connect a post-mold cooling table 70 (FIG. 1) of the post-molding device 68 between a set of rollers. In particular, the cooling table mount 116 includes a bottom roller 126 configured to rotatably engage a bottom surface of the cooling table 70, and a pair of side rollers 124 configured to rotatably engage an inside and an outside circular side surface of the cooling table 70. A top roller 122 mounted on the outside surface of the of the rotor upright 34 engages a top surface of the cooling table 70. An inwardly extending hook feature at the base of the rotor upright 34 provides a cam mount 39 for receiving a shooting pot cam 31C. An inside surface of the rotor upright 34, just above the upper roller 118, provides a side cam mount 110 for receiving a mold stroke cam 31B. Extending between a pair of rotor uprights 34 is a bottom cam mount 114 for receiving a shooting pot cam 31C. The bottom surface of the rotor spoke 33 provides a top cam mount 112 for receiving a clamping cam 31A. Also provided between a pair of the rotor uprights 34, above the bottom cam mount 114, is a handling device mount 117. The handling device mount 117 preferably configured to receive a pair of molded article handling devices including a first molded article handling device 90 and second molded article handling device 92. The first molded handling device retrieves the just-molded molded articles 2 from the molding devices 16 whereas the second molded article handling device 92 re-handles the molded articles 2 from the first molded article handling device 90 to a holder 72 mounted to the top surface of the post-mold cooling table 70 (reference FIG. 1). Lastly, a drive 28 for rotation of the rotor 30 relative to the frame 14 is shown in FIG. 5, the drive 28 is preferably mounted to the sub-frame 15 with a belt connection to the rotor hub 32 for rotation of the rotor 30. Another drive (not shown) is located between the rotor 30 and the cooling table 70 for rotation of the cooling table relative to the rotor.

Figure 7:
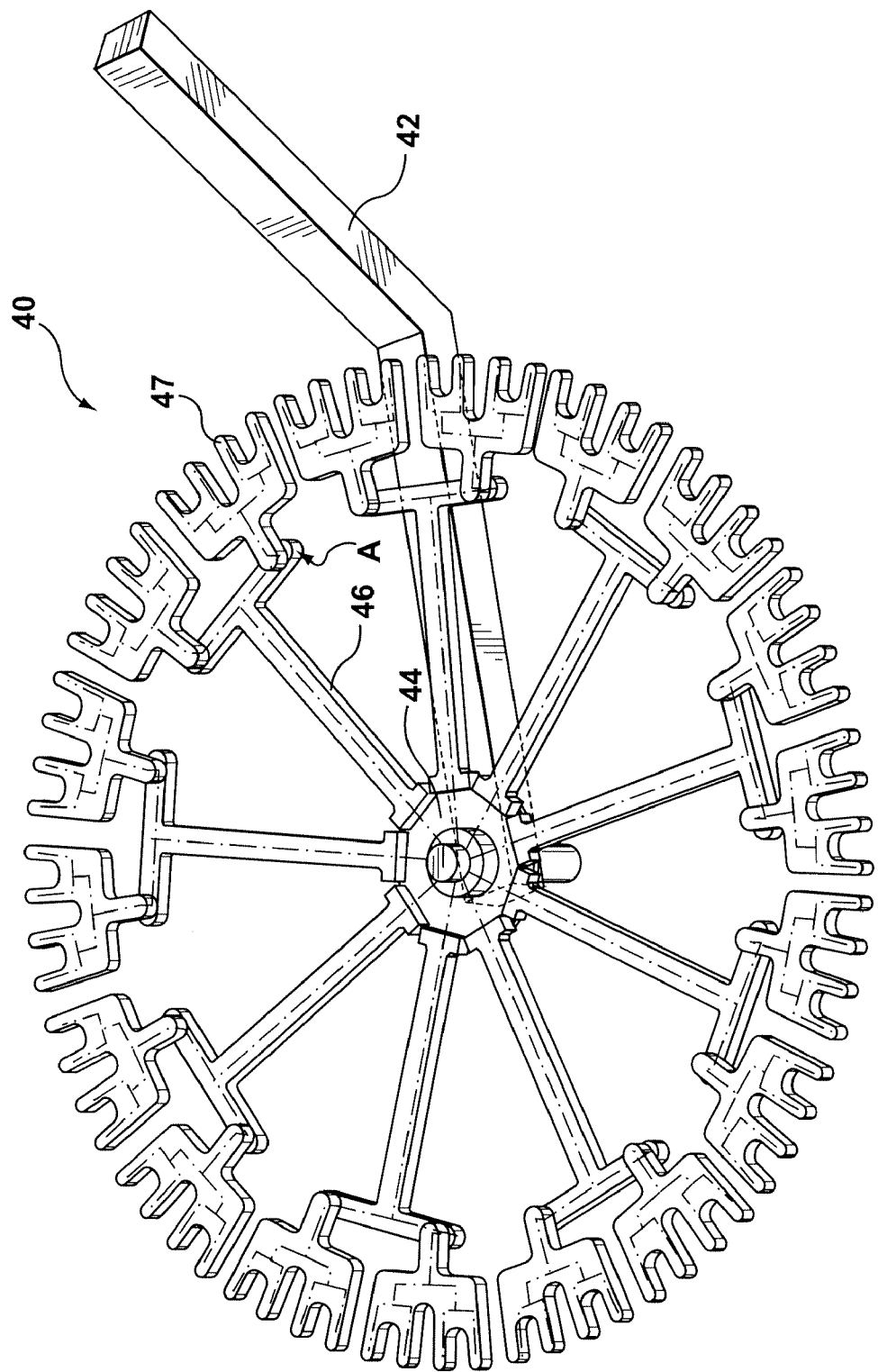
FIG. 7 is a perspective view of a hot runner of the continuous molding machine of FIG. 1.

With reference to FIGS. 1 & 7, the hot runner 40 will now be described in more detail. The hot runner 40 includes the main melt conduit 42 that extends through the frame cover 20 that provides a connection between an extruder (not shown) and a hub melt distributor 44. The extruder is preferably configured to operate in a continuous manner, although operation in a semi-continuous manner is not precluded. The main melt conduit 42 as shown in FIG. 2 includes a downwardly extending portion and an upwardly extending portion 42' such that the melt conduit 42 does not interfere with the molding device 16 mounted to the table 22. Extending radially from the hub melt distributor 44 is a plurality of radially extending spoke melt conduits 46. In accordance with an exemplary embodiment, the spoke melt conduits 46 are T-shaped with a top portion of the "T" configured to include several melt drops that feed several manifolds 47. The manifolds 47 preferably include a series of fingers that each includes a melt drop for feeding a separate molding devices 16 with molding material. Those skilled in the art would appreciate that the configuration of the hot runner 40 may be varied considerably and that the connections between the components of the hot runner 40 and with the molding devices 16 includes a seal (not shown) that accommodates radial and lateral thermal expansion of the components. In the exemplary embodiment a sliding seal (not shown) is configured at an interface between the components by the provision of a compressive sealing force across the interface as is generally known to those skilled in the art. The description of the seals will not be described in any further detail as the provision of such is within the skill of those in the art.

Figure 3:
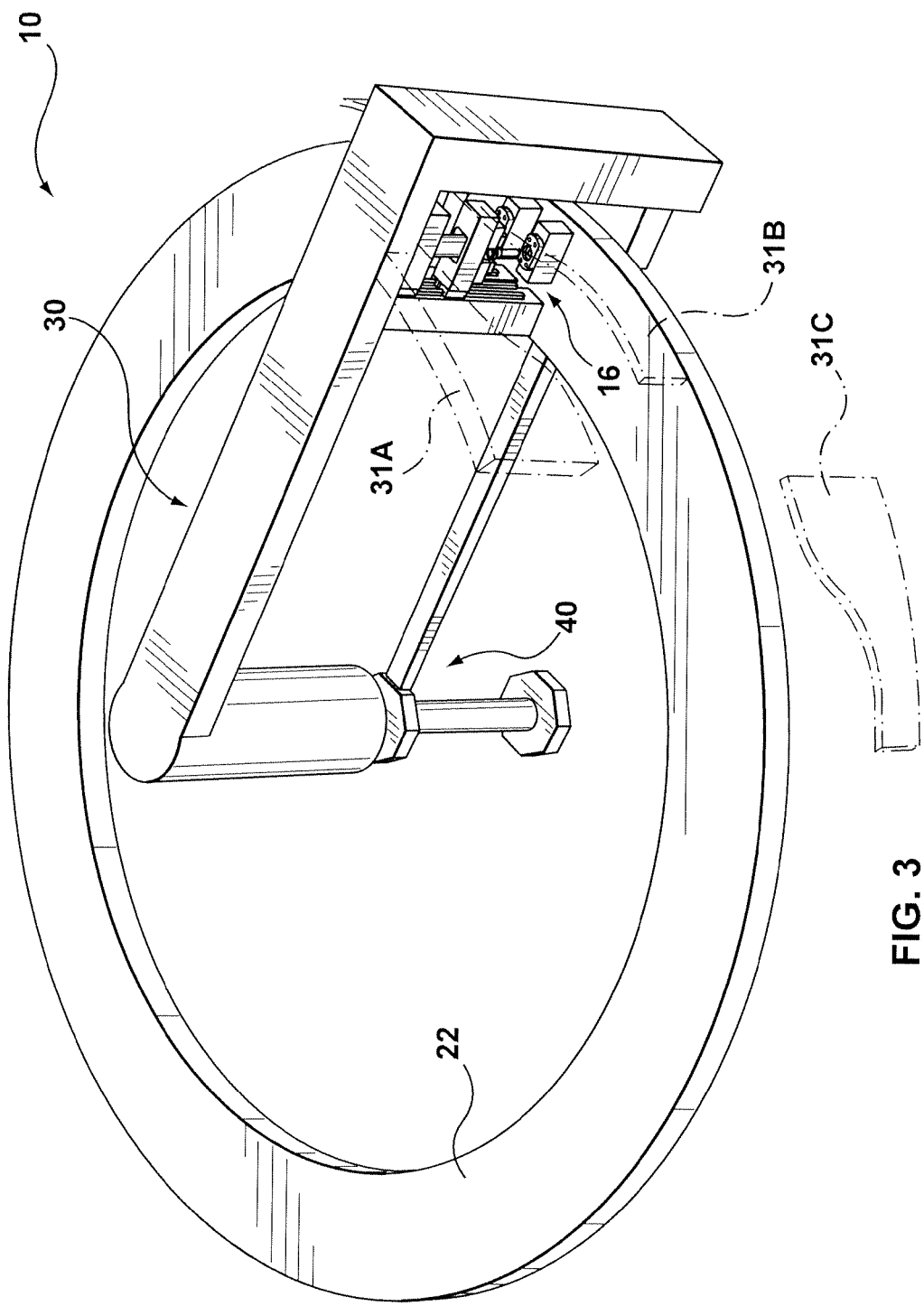
FIG. 3 is a conceptual exemplary embodiment of the continuous molding machine of FIG. 1.

With reference to FIG. 3, a simplified conceptual depiction of the continuous molding machine 10 is shown that readily depicts the structure and operation of the continuous molding machine. In particular, the conceptualized continuous molding machine 10 includes a single molding device 16 mounted on the table 22 and that the rotor 30 is represented by a single spoke. Shown in space (partially) but in reality connected to the rotor 30 are a clamp cam 31A, a mold stroke cam 31B, and a shooting pot cam 31C. In addition, a simplified hot runner 40 is shown feeding molding material to the molding devices 16 from the bottom of the mold out of view. In operation, the rotor 30 is made to rotate about the table 22 and that as the rotor 30 sweeps around the molding devices 16 the cams 31A, 31B, and 31C interact with the molding device 16 to cause the operation of various molding functions. The interaction between the cams 31A, 31B, and 31C and the molding device 16 preferably imparts at least a portion of the energy required to perform the molding functions. The molding functions include, but not limited to, a mold stroke function, a molded article ejection function, an melt handling function, a valve gate function, and a mold clamping function, as will be described in more detail hereinafter.

Figure 4C:
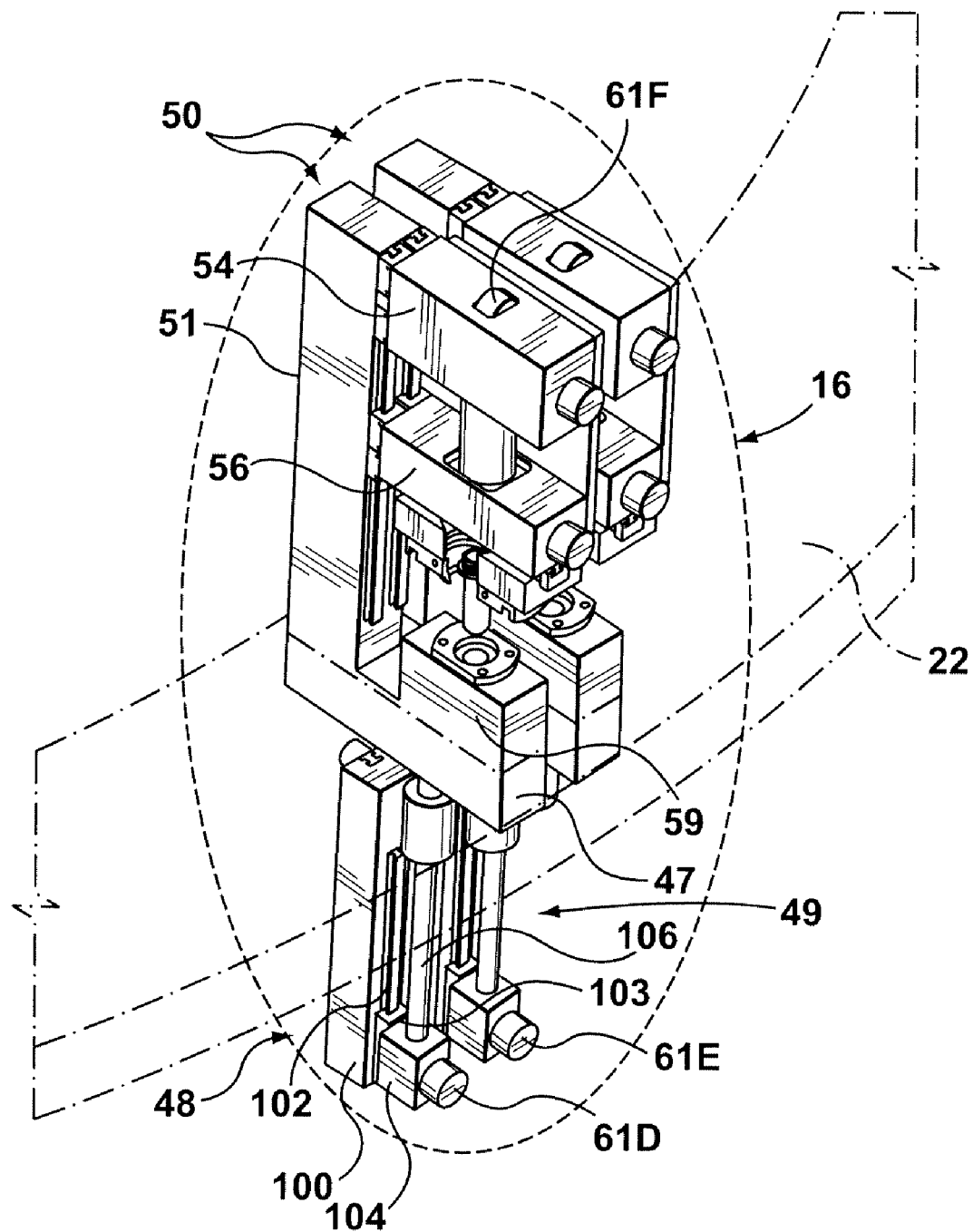
FIG. 4C is a perspective view of a pair of molding devices that includes the mold of FIGS. 4A & 4B, the molding devices shown mounted on a table (shown in phantom) of the continuous molding machine according of FIG. 1.

With reference to FIG. 4C it is shown the exemplary embodiment of the molding device 16 includes a mold 50. As best shown with reference to FIG. 4A the mold 50 includes a frame 51 that is configured to be mountable to the table 22. The frame 51 includes a linear race 52 on a front surface thereof. Running on the linear race are linear bearings 53 for slidably connecting core and stripper plates 54 and 56.

Accordingly, the core plate 54 and the stripper plate 56 may ride up and down relative to the frame 51 in a guided manner. A cam follower 61A is provided on an exposed side surface of the core plate 54. Likewise a cam follower 61B is provided on a similarly exposed face of the stripper plate 56. The cam followers 61A and 61B are configured to cooperate with a mold stroke cam profile 120A and ejection cam profile 120B that are provided as tracks in the mold stroke cam 31B, as shown with reference to FIG. 6. A closer inspection of the cam profiles 120A and 120B will reveal that as the mold stroke cam is driven past the stationary cam followers 61A and 61B of the mold 50, that the core plate 54 and stripper plate 56 will be forced to move up and down relative to the table 22 whereby the mold functions of mold stroke and ejection are provided.

With reference again to FIG. 4A, a pair of slides 57 are shown that are guidably mounted to the stripper plate 56 by guides. The slides 57 are configured to receive a bifurcated pair of split inserts 58 (commonly known as 'neck rings') which may be configured to form a trapped outer portion of the molded article (such as a thread finish of a preform). With reference to FIG. 4B, it is shown that the slides 57 are driven to engage and disengage the split inserts 58 by action of a mold cam 62 interacting with a pair of cam followers 61C that are connected on a side surface of the slides 57. Accordingly, as the stripper plate 56 is moved relative to the core plate 54 by virtue of the cam profiles and the mold stroke cam 31B, the slides may be operated between the engaged configuration and the disengaged configuration. Accordingly the molded article may be stripped from the molding surface of a core insert 55 that is mounted to the core plate 54. The core insert 55 is configured to mold an inner surface of the molded article. Lastly, the mold 50 includes a cavity plate 59 that is configured to be mountable directly to the table 22. The cavity plate 59 is configured to receive a cavity insert 60 which forms an outer surface of the molded article that isn't otherwise formed by the split inserts 47.

With reference to FIG. 4C, further detail of the mold 50 is shown, including a cam follower 61F that is configured on a top surface of the core plate 54. The cam follower 61F configured to engage with a mold clamp camming profile 120F that is provided along a bottom surface of the clamp cam 31A as shown in FIG. 6. Accordingly, as the clamp cam 31A is driven past the cam follower 61F, a clamping force may be imparted thereby to keep the mold 50 closed during injection of the molding material whereby the mold clamping function is provided.

The molding device 16 also includes a shooting pot actuator 48 that is configured to cooperate with a shooting pot (not shown). The shooting pot is preferably defined in the manifold 47 for injecting molding material into the mold 50. The shooting pot is preferably configured to hold a single shot of molding material sufficient to fill a molding cavity defined within the mold 50, preferably with a small buffer of small buffer of molding material. The shooting pot actuator 48 is fed by the manifold 47 of the hot runner 40. The structure of shooting pots is well known to those skilled in the art and hence will not be described in any further detail. The shooting pot actuator 48 includes a frame 100 mountable on the bottom of the table 22. On a face of the frame 100 is provided a linear race 102 upon which rides a linear bearing 103 slidably connecting a bearing block 104 to the frame 100. Mounted on the top face of the bearing block 104 is a piston rod 106, the opposite end of the piston rod 106 being received in, and co-operable with the shooting pot defined in the manifold 47. On a front face of the bearing block 104 is provided a cam follower 61D that is configured to engage with an injection cam profile 120D configured in the shooting pot cam 31C (reference FIG. 6). Accordingly, as the shooting pot cam 31C rotates about or relative to the molding device 16, the cam follower 61D riding in the cam profile 120D will cause the piston rod 106 to extend into the shooting pot for injecting the molding material into the holding cavity and for subsequently retracting from the shooting pot whereby a next shot of molding material is drawn therein whereby the melt handling function is provided. The cam profile 120D may be configured as a track that positively traps the cam follower 61D between upper and lower profiles.

Alternatively, the cam profile (not shown) may have a single profile and that the cam follower 61D is kept engaged with the single cam profile by means of a spring-bias linking the bearing block 104 with the table 22.

As a further alternative (not shown), the continuous molding machine may forego a cam actuation of the shooting pot actuators 48 in favor of a independently controllable linear actuators (such as a linear motor, hydraulic cylinder, etc.). In so doing, additional processing flexibility can be retained in the system where required.

Preferably, the device further includes a valve gate actuator 49 for the positioning of a valve pin (not shown) that controllably connects the molding cavity to the shooting pot. The valve gate actuator 49 is preferably configured in the same manner as the shooting pot actuator 48. Accordingly, a cam follower 61E is arranged in a valve gate cam profile 120E of the shooting pot cam 31C for actuation of the valve pin whereby the valve gate function is provided. Alternatively, the manifold 47 may be configured to include a thermally gated nozzle, whereby the valve gate actuator would not be required.

The post-mold cooling device 68 in FIG. 8 will now be described in more detail. The post-mold cooling device 68 includes a post-mold cooling table 70 rotatably mounted to the rotor 30, as described previously, with a plurality of molded article holders 72 arranged in equi-angularly spaced circular array on a top surface of the table. Alternatively, the cooling table 70 may be rotatably connected to the frame 14 directly (as opposed to indirectly via the rotor 30). The mold article holders 72 are preferably water-cooled tubes such as those described in commonly assigned U.S. Pat. No. 4,729,732 (Inventor: SCHAD, Robert, Published: 8 Mar. 1988) for providing additional cooling of the molded article 2. The rotor 30 may include a rotary manifold (not shown) for connecting the molded article holders 72, via a network of channels in the cooling table 70, with a source/sink of coolant.

The arrangement of the molded article holders 72 on the post-mold cooling table 70 may have a simple low density configuration as shown in reference to arrangement 'A', in FIG. 1, in which case there is a one-to-one relationship with one molded article holder 72 for each molding device 16. Alternatively, there may be a many-to-one relationship with multiples of molded article holders 72 arranged on the table relative to the number of molding devices 16. For example, with reference to arrangement 'B', in FIG. 1, there are provided three circular and concentric rows of molded article holders 72 with the corresponding holders 72 of the rows being radially aligned on the cooling table 70. As a further alternative, the additional molded article holders 72 may be interlaced between the primary molded article holders 72 along a common circular row around the periphery of the table, as shown with reference to arrangement 'C', in FIG. 1.

Figure 9:
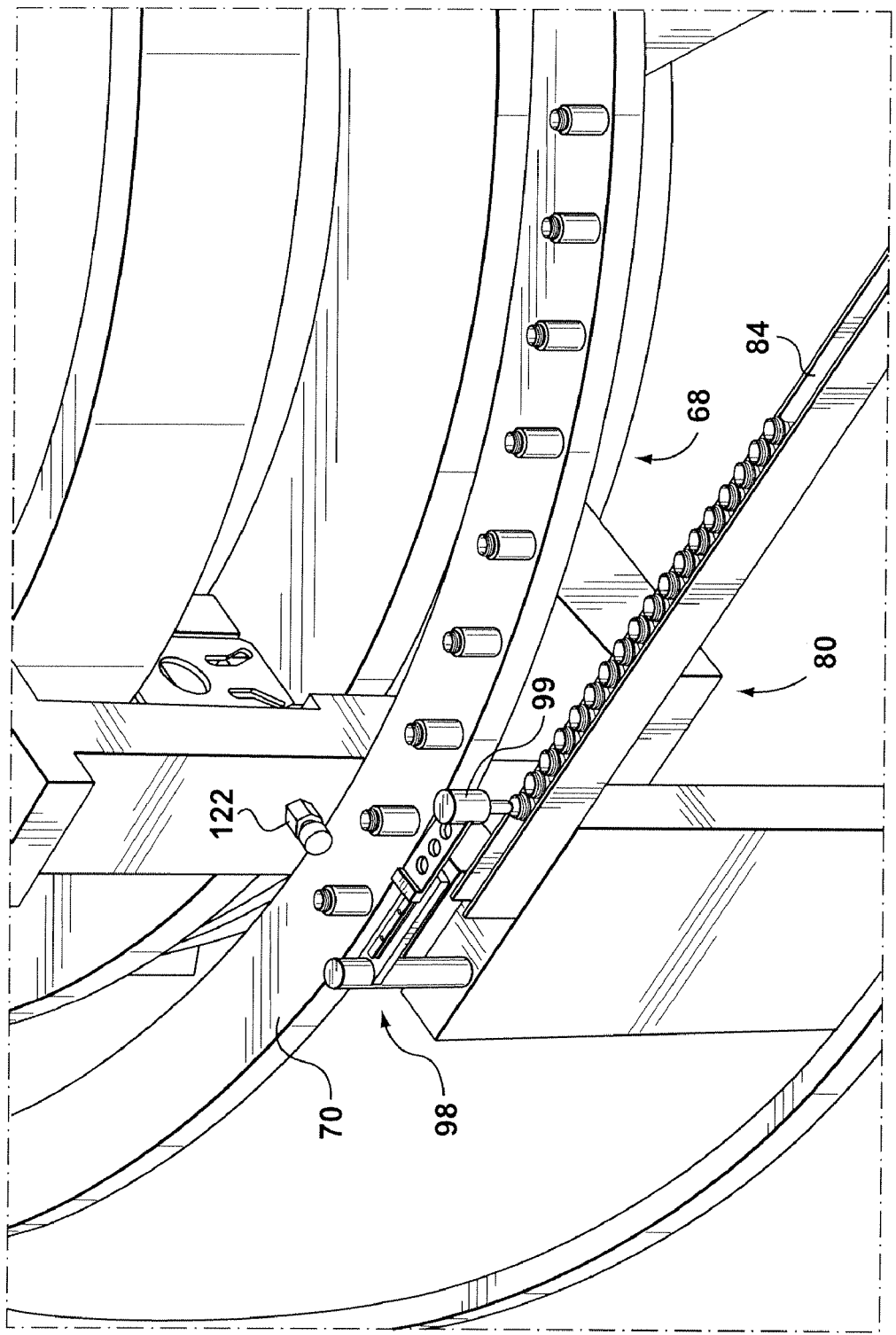
FIG. 9 is a perspective view of a portion of the continuous molding machine of FIG. 1 that depicts a third molded article handling device during a step of transferring molded article from the post-molding device to a molded article transport device.

To remove the molded articles 2 from molded article holder 72 for placement into the molded article transport device 80, there is provided a third molded article handling device 98 that is mounted on the frame 14 of the continuous molding machine 10 as shown with reference to FIG. 9.

Figure 8:
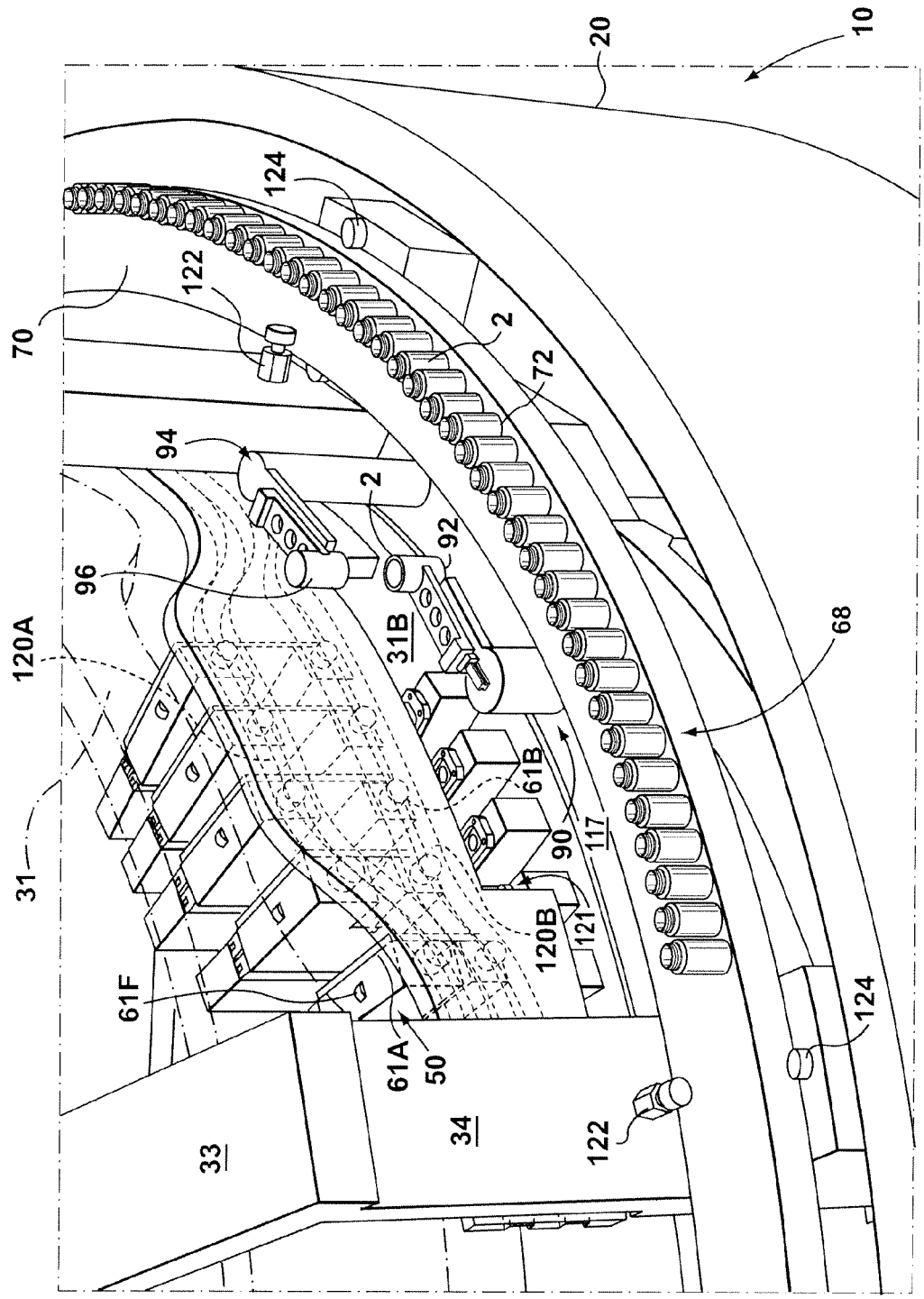
FIG. 8 is a perspective view of a portion of the continuous molding machine of FIG. 1 that depicts a first and second molded article handling device during a step of transferring molded article from the mold to a post-molding device.

With reference to FIG. 8, the first and second molded article handling devices 90 and 94 can be seen as including a molded article holder 92 and picker 96, respectively, mounted at the end of an arm, the arm being rotatably mounted to the handling device mount 117 on the rotor 30. In operation, the arm of the first molded article handling device 90 will rotate to position the holder 92 to retrieve a molded article 2 from the mold 50, whereupon the arm will rotate again to position the molded article 2 outside of the mold 50. Once outside of the mold 50, the molded article 2 is removed from the holder 92 by the picker 96 of the second molded article handling device 94, whereupon the arm of the second molded article handling device 94 will rotate to position the molded article 2 for insertion into the molded article holder 72. The first and second molded article handling devices may also include an actuator for a raising and lowering of the holder 92 and/or picker 96 to assist in acquiring and releasing of the molded article 2. In the exemplary embodiment the mold stroke cam 31B includes a part handling window 121 through which the holder 92 of the first molded article handling device 90 intermittently extends to access the molded articles 2 as they are released from the mold 50.

To synchronize a continuous placement of the just-molded articles 2 into empty molded article holders 72, the cooling table 70 is rotated at a different angular rate than the rotor 30. The cooling table 70 may be rotated faster or slower than the rotor 30.

With reference to FIG. 9, the molded article transport device 80 includes an outlet track 84 for transport of the molded articles 2 away from the continuous molding machine 10 to the auxiliary process, storage, and/or packaging operations of the molded articles 2 as described hereinbefore. With reference to FIG. 1, it is shown that the molded article transport device 80 further includes an optional circular collector track 82 for additional buffering of molded articles 2 after they have been removed from the post-molding device 68 by the third molded article handling device 98. The track 82 includes a device (not shown) for transporting the molded articles 2 along the track 82. The device may include, for example, a paddle rotatably driven around the collector track 82 by a chain or other type of mechanical device. The provision of the collector track is optional.

Figure 10:
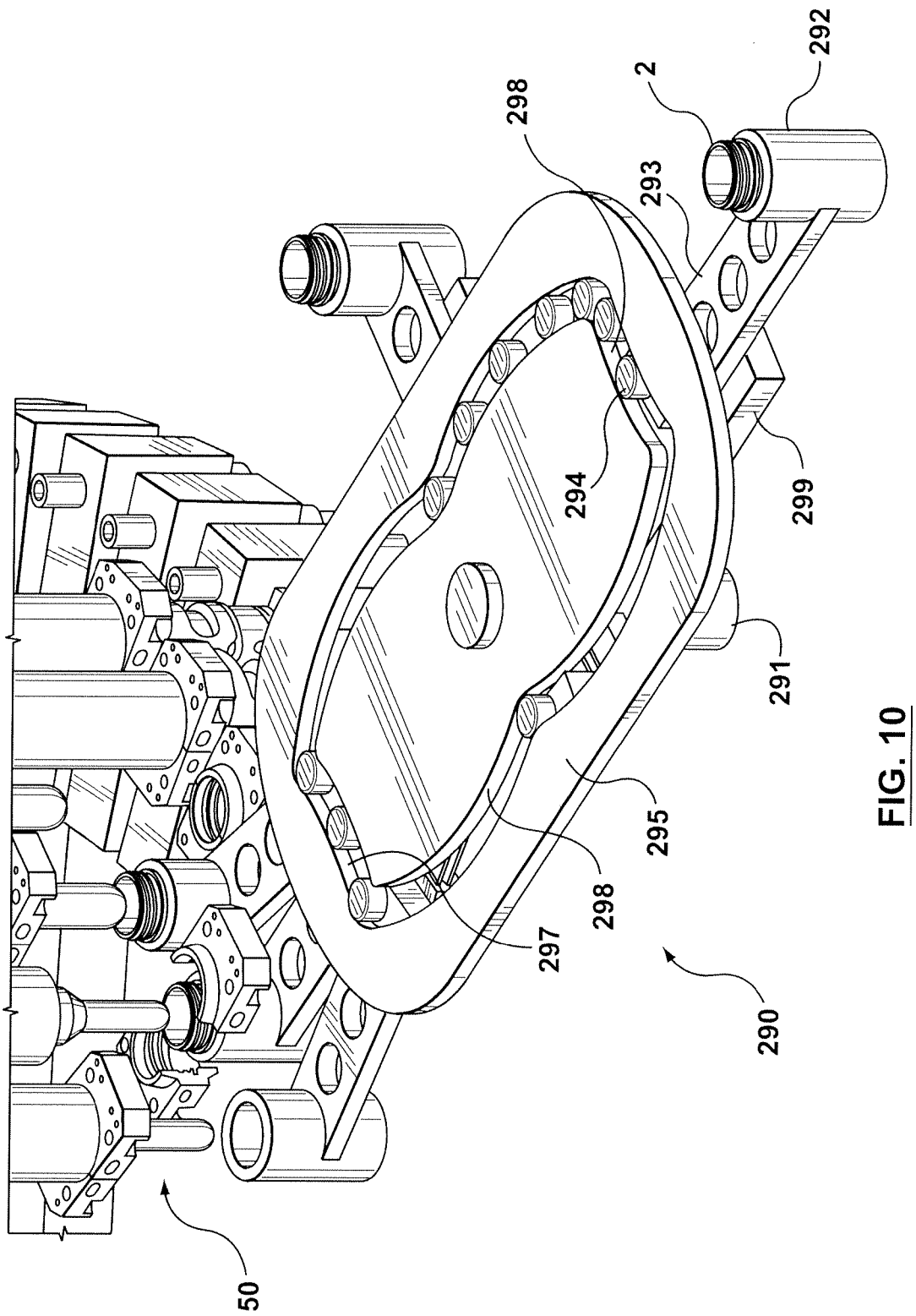
FIG. 10 is a perspective view of a portion of a continuous molding machine according to a second exemplary embodiment that includes another exemplary embodiment of the molded article handling device.

With reference to FIG. 10, an exemplary alternative embodiment of the first molded article handling device 290 is shown. The molded article handling device 290 includes a base 291, a base arm 299 rotatably mounted to the base, a slide arm 293 slidably linked to the base arm 299 with a molded article holder 292 configured at a free end thereof, a cam 295 non-rotatably linked to the base 291. The slide arm 293 configured to be movably linked to the cam 295 for driving a sliding of the slide arm 293 with respect to the base arm 299, whereby the molded article holder 292 is translatable along a profiled path for retrieving just-molded articles from a molding device 16 of a continuous molding machine 10. Preferably, the cam 295 defines a profiled path for the holder 292 that includes a first tracking portion 297 that allows the molded article holder 292 to track with the molding device 16 as the rotor 30 sweeps there-past. Likewise, the cam 295 also preferably defines the profiled path to include a second tracking portion 297 that allows the molded article holder 292 to track with another molded article handling device or the molded article holder 72 of a post-molding device 68 as the rotor 30 sweeps there-past. In the exemplary embodiment the slide arm 293 and the cam 295 are movably linked by a cam follower 294 rotatably linked to the slide arm 293, the cam follower 294 driven along a cam profile 298 in the cam 295 by the rotation of the base arm 299.

In accordance with another alternative embodiment of the invention (not shown) at least one of the handling devices 90, 94, 98 may be configured to position an insert (not shown) in the molding device 16. The insert may be, for example, a volume of molding material to be compression molded in the molding device 16. Alternatively, the insert could, for example, be a label, a neck finish, a radio frequency identification device, etc.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims:

What is claimed is:

1. A continuous molding machine, comprising:
   a frame;
   a mold structure mounted to the frame, the mold structure includes a mold having a core plate and a cavity plate;
   a shooting pot for injecting molding material into a molding cavity that is defined in the mold; and
   a valve gate actuator for the positioning of a valve pin that controls a connection between the molding cavity and the shooting pot;
   a cam movably linked to both the frame and to the mold structure with which to impart at least a portion of the energy required for driving, in use, functions of the mold structure including a mold stroke function, a melt handling function, and a valve gate function,
   wherein:
   a mold stroke cam profile configured in the cam cooperates, in use, with a cam follower that is connected to one of the core plate and the cavity plate for performing the mold stroke function that drives the one of the core plate and the cavity plate relative to a remaining one of the core plate and the cavity plate;
   an injection cam profile configured in the cam cooperates, in use, with a further cam follower that is connected to the shooting pot actuator for performing the melt handling function;
   a valve gate cam profile configured in the cam cooperates, in use, with another cam follower that is connected to the valve gate actuator for performing the valve gate function.

2. The continuous molding machine according to claim 1, wherein:
   a plurality of the mold structures are arranged in a circular array and that the cam is rotatably linked to the frame and to the mold structure.

3. The continuous molding machine according to claim 1, wherein:
   a plurality of the mold structures are arranged in a linear array and that the cam is movably linked, linearly, to the frame and to the mold structure.

4. The continuous molding machine according to claim 1, wherein:
   the mold further includes a stripper plate and a further cam follower connected to the stripper plate, the further cam follower configured to cooperate with an ejection cam profile configured in the cam for performing the molded article ejection function that drives the stripper plate relative to the core plate.

5. The continuous molding machine according to claim 1, wherein:
   the cam follower configured to cooperate with a mold clamp cam profile configured in the cam for performing the mold clamping function that clamps the one of the core plate and the cavity plate relative to the remaining one of the core plate and the cavity plate.

6. The continuous molding machine according to claim 1, wherein:
   the cam is mounted to a rotor, the rotor movably linked to the frame.

7. The continuous molding machine according to claim 6, further including:
   a first molded article handling device connected to the rotor, the molded article handling device configured to handle just-molded molded articles from the mold structure.

8. The continuous molding machine according to claim 7, wherein:
   the cam includes a part handling window through which the first molded article handling device can transfer the molded articles.

9. The continuous molding machine according to claim 7, further including:
   a post-molding device for holding the molded articles received from the first molded article handling device.

10. The continuous molding machine according to claim 7, further including:
    a second molded article handling device connected to the rotor, the second molded article handling device configured to handle just-molded molded articles from the first molded article handling device; and
    a post-molding device for holding the molded articles received from the second molded article handling device.

11. The continuous molding machine according to claim 9 or 10, further including:
    a third molded article handling device connected to the frame, the third molded article handling device configured to handle molded articles from the post-molding device.

12. The continuous molding machine according to claim 11, further including:
    a molded article handling device for receiving and transporting the molded articles received from the third molded article handling device.

* * * * *